W. A. JAMESON.
LIQUID DISPENSING VESSEL.
APPLICATION FILED NOV. 18, 1909.

1,009,070.

Patented Nov. 21, 1911.

WITNESSES:

INVENTOR

ATTORNEYS.

COLUMBIA PLANOGRAPH CO., WASHINGTON, D. C.

UNITED STATES PATENT OFFICE.

WILLIAM A. JAMESON, OF NIAGARA FALLS, NEW YORK.

LIQUID-DISPENSING VESSEL.

1,009,070.     Specification of Letters Patent.     Patented Nov. 21, 1911.

Application filed November 18, 1909. Serial No. 528,681.

*To all whom it may concern:*

Be it known that I, WILLIAM A. JAMESON, a citizen of the United States, residing at Niagara Falls, in the county of Niagara and State of New York, have invented certain new and useful Improvements in Liquid-Dispensing Vessels, of which the following is a full, clear, and exact description, such as will enable others skilled in the art to which it appertains to make and use the same.

This invention relates to liquid dispensing vessels and the like.

One of the objects of this invention is to construct a vessel of the above general character which will be simple in construction, easy to operate and efficient in use.

Another object of the invention is to provide a vessel of the above character that will have a small number of parts so arranged as not to be easily displaced or become out of order and having the parts so separated as to permit the whole construction to be easily cleaned or kept in a clean and sanitary condition.

Another object of this invention is to provide a vessel of the above nature with efficient and accurate means for regulating the amount of liquid to be discharged. Other objects will be in part obvious and in part hereinafter pointed out.

The invention accordingly consists in the features of construction, combinations of elements and arrangements of parts which will be exemplified in the construction hereinafter set forth and the scope of the application of which will be indicated in the following claims.

Figure 1:
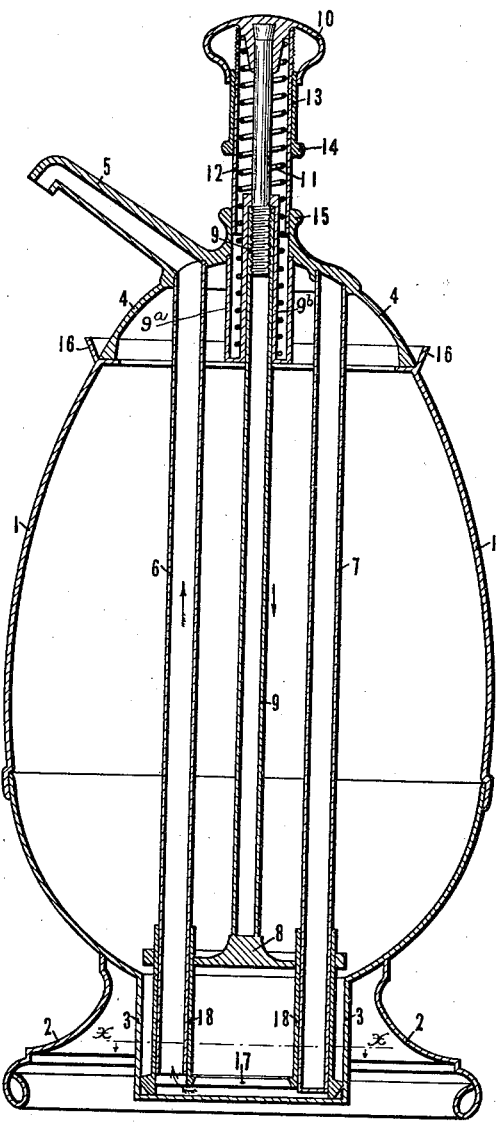
Figure 2:
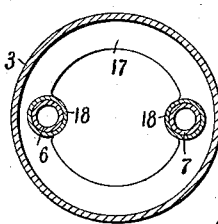

In the accompanying drawing, wherein is shown one of several various possible embodiments of this invention, Figure 1 illustrates the complete device in a vertical sectional view; and Fig. 2 is a sectional view taken on the line X—X of Fig. 1 looking in the direction of the arrows showing certain details.

In order that this invention may be more readily understood, it may be noted that vessels of the general character of those with which this invention deals are often employed for syrup or flavoring extract used in the preparation of various beverages obtainable at soda fountains in which it is desired that the amount of syrup be regular. As different soda fountains are supplied with glasses of different sizes and as the viscosity and other qualities of the several syrups vary, the difficulty of quickly obtaining the desired amount will be readily seen. The above and other defects are done away with in constructions of the nature of that hereinafter described.

Referring now to the accompanying drawing in detail, there is shown at 1 the main body or receptacle which is adapted to be filled with the syrup or other liquid. This body is mounted on a base 2 suitably secured thereto in any well known manner so as to present a firm foundation for the apparatus and the lower part of the body 1 of the receptacle is provided with a well 3 preferably made integral therewith. A cover 4 is provided for an opening at the top of the receptacle, said cover having a discharge spout 5 which is connected with a tube 6 depending into the well 3. At the opposite side of the cover 4 is provided a tube 7 closed at both ends and also depending into the well 3, which, with the tube 6, acts as a guide for a plunger 8 mounted at the lower end of a rod 9 which is adapted to be forced down into the well on depression of a knob 10 at the top of the apparatus. The piston 8 is preferably circular in shape and adapted snugly to fit the interior of the well 3 so that when depressed the syrup in the well is forced up the tube 6 and out of the discharge spout 5. Surrounding the tube 9 and secured to the cover 4, are two concentric sleeves 9$^a$ and 9$^b$ adapted to contain a spring 11 normally exerting an upward pressure against the under surface of the knob 10.

Secured to the knob 10 is a sleeve 12 inclosing the spring 11 and adapted to reciprocate in the annular space between the sleeves 9$^a$ and 9$^b$ when the plunger is depressed. The upper part of this sleeve 12 is threaded for engagement with an outer sleeve 13 provided at its lower end with a knurled collar 14 adapted to strike against a similar collar 15 provided at the upper portion of the cover 4. By turning this sleeve 13 the normal distance between the collars 14 and 15 may be diminished or increased to correspondingly diminish or increase the depth to which the plunger 8 may be depressed into the well 3. In this manner the amount of syrup to be discharged from the well on depression of the plunger may be regulated to any desired amount.

A flange 16 is preferably provided at the point of connection between the body 1 of the receptacle and the cover 4 to prevent the cover from easily being displaced on operation of the plunger. Also, if desired, an annular ring 17 Fig. 2 may be provided, having upwardly projecting sleeves 18 surrounding the tubes 6 and 7 to firmly hold these tubes in relative position and guide the movement of the plunger 8. A particular function of the sleeves inclosing the lower ends of the tubes is to prevent the friction of piston wearing off silver plating thereon and exposing the base metal to the action of the syrup.

The operation and manner of use of this apparatus are in brief as follows: After the receptacle has been filled with syrup or extract through the opening at the top, and the cover replaced with the tube 6 extending to substantially the bottom of the well 3, a depression of the knob 10 will cause the plunger 8 to be depressed forcing the liquid within the well up through the tube 6 and out of the spout 5 into the glass. On releasing the pressure on the knob 10, the spring 11 will return the same to normal position leaving a space between the plunger 8 and the top edge of the well 3, permitting the liquid within the receptacle to flow into the well and refill the same. The return action of the plunger also draws the syrup remaining in the spout back into the well and prevents dripping. If a larger or smaller size glass is to be used requiring a corresponding change in the amount of syrup, a rotation of the sleeve 13 in one direction or the other will so alter the space between the collars 14 and 15 as to cause a corresponding amount of change in the amount to which the plunger 8 may be depressed. It is therefore seen that there is provided a device which is simple in construction and easy in operation, having a small number of parts so that the same may be easily and quickly cleaned and at the same time practically constructed so as to prevent a displacement or derangement of the various parts of the mechanism.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. In an apparatus of the class described, in combination, a receptacle, a cover portion, hollow rods between the cover and the lower portion of said receptacle, means connecting said rods and surrounding the lower portion thereof, and a reciprocating plunger adapted to be guided in its movement by said means, one of said rods adapted to act as a discharge passage.

2. In an apparatus of the class described, in combination, a receptacle, a cover portion, hollow rods between the cover and the lower portion of said receptacle, one of which is adapted to act as a discharge passage means connecting said rods and surrounding the lower portion thereof, a reciprocating plunger adapted to be guided in its movements by said means, and means without said receptacle for operating said plunger to discharge the contents of said receptacle when the plunger is depressed.

3. In an apparatus of the class described, in combination, a receptacle, a cover therefor, a reciprocating plunger coacting with the lower portion of said receptacle, a discharge passage communicating with the lower portion of said receptacle through which the liquid is adapted to be forced on the depression of said plunger, a sleeve around the stem of said plunger means surrounding said sleeve and threadedly connected therewith adapted to coact with said cover to regulate the amount to which said plunger may be depressed and spring means within said sleeve adapted to return the plunger to normal position.

4. In an apparatus of the class described, in combination, a receptacle, a cover fitting the top of said receptacle, a reciprocating plunger passing through said cover and coacting with the lower portion of said receptacle, a discharge spout communicating with the lower portion of said receptacle through which the liquid is adapted to be forced on depressing said plunger, a sleeve about said plunger secured to said cover, a second sleeve about and secured to the stem of said plunger, and means intermediate said sleeves for returning said plunger to normal position.

5. In an apparatus of the class described, in combination, a receptacle, a cover therefor, a reciprocating plunger passing through said cover and coacting with the lower portion of said receptacle, a discharge spout communicating with the lower portion of said receptacle through which the liquid is adapted to be forced on depression of said plunger, a sleeve about said plunger secured to said cover, a second sleeve about and secured to the stem of said plunger, one of said sleeves adapted to interfit within the other when said plunger is depressed, and means intermediate said sleeves for returning said plunger to normal position.

6. In an apparatus of the class described, in combination, a receptacle, a cover therefor, a reciprocating plunger passing through said cover and coacting with the lower portion of said receptacle, a discharge spout communicating with the lower portion of said receptacle through which the liquid is adapted to be forced on depression of said plunger, a sleeve about said plunger secured to said cover, a second sleeve about and secured to the stem of said plunger, one of said sleeves adapted to interfit within the other when said plunger is depressed, a spring intermediate said sleeves for returning said plunger to normal position, and means for regulating the amount to which said plunger may be depressed.

In testimony whereof I affix my signature, in the presence of two witnesses.

WILLIAM A. JAMESON.

Witnesses:
H. K. BLANCHARD,
B. J. MOSIER.

---

Copies of this patent may be obtained for five cents each, by addressing the "Commissioner of Patents, Washington, D. C."